United States Patent [19]

Brokken et al.

[11] Patent Number: 4,661,358
[45] Date of Patent: Apr. 28, 1987

[54] WORT-SEQUESTERED DIVALENT METAL SALTS

[75] Inventors: Kyle A. Brokken, Chaska; Randolph S. Porubcan, Victoria, both of Minn.

[73] Assignee: Quali Tech, Inc., Chaska, Minn.

[21] Appl. No.: 768,961

[22] Filed: Aug. 23, 1985

[51] Int. Cl.$^4$ .................. A23K 1/06; A23K 1/175
[52] U.S. Cl. ........................ 426/72; 426/74; 71/26
[58] Field of Search ............ 426/72, 31, 29, 74, 426/635, 807; 252/DIG. 11, 156, 180; 71/26; 514/518

[56] References Cited

U.S. PATENT DOCUMENTS

| | | | |
|---|---|---|---|
| 2,717,243 | 9/1955 | Bloch et al. | 252/DIG. 11 |
| 2,868,724 | 1/1959 | Zech | 210/58 |
| 3,022,343 | 2/1962 | Behnke | 252/DIG. 11 |
| 3,062,878 | 11/1962 | Karabinos et al. | 252/DIG. 11 |
| 3,074,927 | 1/1963 | Saltman et al. | 252/DIG. 11 |
| 3,661,960 | 5/1972 | Carlson | 252/DIG. 11 |
| 3,764,341 | 10/1973 | Carbonniere | 99/2 CD |
| 3,769,222 | 10/1973 | Yurko et al. | 252/DIG. 11 |
| 3,876,810 | 4/1975 | Carbonniere | 426/74 |

FOREIGN PATENT DOCUMENTS

| | | | |
|---|---|---|---|
| 2318590 | 3/1977 | France | 426/31 |
| 51-74874 | 6/1976 | Japan | 426/31 |

OTHER PUBLICATIONS

Mehltretter et al., "New Low Cost Sequestrants" Soap & Chemical Specialties, Aug. 1959, pp. 49–50 & 106.
Kirk–Othmer Encyclopedia of Chemical Technology, A Standen et al., John Wiley & Sons, Inc., NY (2d ed., 1964), p. 309.
Brewex Technical Bulletin, ARM, Inc., Crystal Lake, ILL (n.d.)

Primary Examiner—R. B. Penland
Attorney, Agent, or Firm—Merchant, Gould, Smith, Edell, Welter & Schmidt

[57] ABSTRACT

A water dispersible solid or semi-solid composition is disclosed which comprises metal ions sequestered by an alkali-modified brewer's wort. The composition provides a source of bioavailable, stabilized trace metals for use in animal feeds or fertilizers.

14 Claims, 1 Drawing Figure

WORT-SEQUESTERED DIVALENT METAL SALTS

FIELD OF THE INVENTION

The present invention is directed to a method of sequestering divalent metal ions with brewer's wort which has been treated with base. The resultant product can be converted to a dry, water-dispersible product which is useful as a trace element source, e.g. for addition to animal feeds and fertilizers.

BACKGROUND OF THE INVENTION

Divalent metal salts such as metal sulfates have been widely employed as supplemental sources of trace metals in agronomy and animal nutrition. However, the high reactivity of metal sulfates can be disadvantageous when the salts are added directly to animal feeds or to vitamin-containing feed premixes. For example, scavenger compounds such as phytic acid and phosphates can form biologically-unavailable complexes with free metal ions in the stomach of animals and in the rhyzosphere of plants. To compensate for these reactions, high levels of metal sulfates have been added to fertilizers and feed formulations. However, the overuse of trace minerals can also give rise to nutritional problems, e.g. due to metal-metal interactions in vivo, and can contribute to environmental pollution. For example, see N. T. Davies, "Antinutrient Factors Affecting Mineral Utilization," in Proc. Nutr. Soc., 38, 121 (1979). Furthermore, metal sulfates can adversely effect the activity of other feed components such as vitamins.

Attempts to overcome these disadvantages have led to the introduction of metal salts into feeds and fertilizers in combination with various chelating or sequestering agents. Chelating agents are recognized as those in which the metal ion-substrate bonds are substantially covalent in nature. Complexes of metal salts with proteinates, gluconates and EDTA involve bonds of this type. However, the high strength of the metal-substrate bonds often reduces the ultimate bioavailability of the metal ion.

Sequestered metal ions, on the other hand, are generally more bioavailable because the sequestering interactions usually do not involve the formation of highly covalent bonds. Instead, the metal ions are physically entrapped by the substrate matrix and retained by weaker bonding which is primarily electrostatic in nature. Selection of a sequestrant which can be readily broken down by enzymes permits the effective in vivo absorption of the metal ions.

For example, U.S. Pat. Nos. 3,764,341 and 3,876,810 are directed to metal sulfates sequestered via the polysaccharide components of sea kelp. However, the water-insoluble nature of the fibrous portion of the kelp renders the product unsuitable for use in liquid feeds such as milk replacers and for agricultural applications requiring spraying.

Therefore, a need exists for a feed or fertilizer composition including sequestered metal ions, which is also highly water dispersable and/or water soluble. A further need exists for a nutrient composition which can stabilize metal ions against undesirable interactions with other components of the composition or with chemicals present in the target species, while preserving the bioavailability of the metal ions.

SUMMARY OF THE INVENTION

The present invention is directed to a water-dispersible composition containing one or more added nutrient divalent metal ions sequestered by an alkali-modified brewer's wort. The present composition will also preferably include an inert filler as a solidification and flow aid, and a surfactant which can improve the dispersibility of the product.

It has been found that the treatment of spent liquid brewer's wort with alkali yields a complex mixture of carbohydrates which are effective to sequester metal ions such as those of iron, copper, zinc, cobalt and the like. The metal ions are preferably brought into contact with the modified brewer's wort as solutions of the corresponding sulfate salts. The resultant semi-solid complex can be added directly to liquid feeds or, preferably, is dewatered in the presence of fillers and/or added surfactants to yield a granular product.

Thus, the percentages expressed hereinbelow refer to the weight percentages of a given component in the dewatered product.

The present compositions can be exposed to the low pH ranges found in the stomach without releasing significant amounts of the sequestered metal ions. This property is advantageous since most trace metal ion scavenger compounds form biologically unavailable complexes with free metal ions in the stomach. After passage through the acidic environment of the stomach to the small intestine, enzymes such as pancreatin can act to release the metal ions so that they can be absorbed. In the case of plants, the bacteria and enzymes in the rhyzosphere, or root zone, degrade the composition, effecting the release of the metal ions. Thus, the protective effect of the carbohydrate matrix can substantially increase the in vivo bioavailability of the sequestered metal ions.

Furthermore, in aqueous media the present compositions exhibit pH's which are higher, and therefore less likely to irritate the epithelial mucosa of the stomach than the relatively low pH's exhibited by solutions of the commonly employed metal sulfate salts.

Finally, feed mixtures or pre-mixes containing vitamins and an amount of the present composition as the trace metal source exhibit substantially greater resistance to environmental degradation upon exposure to ambient conditions than do feed mixtures incorporating the corresponding free metal salts.

DETAILED DESCRIPTION OF THE INVENTION

Sequestering Agent

Figure 1:
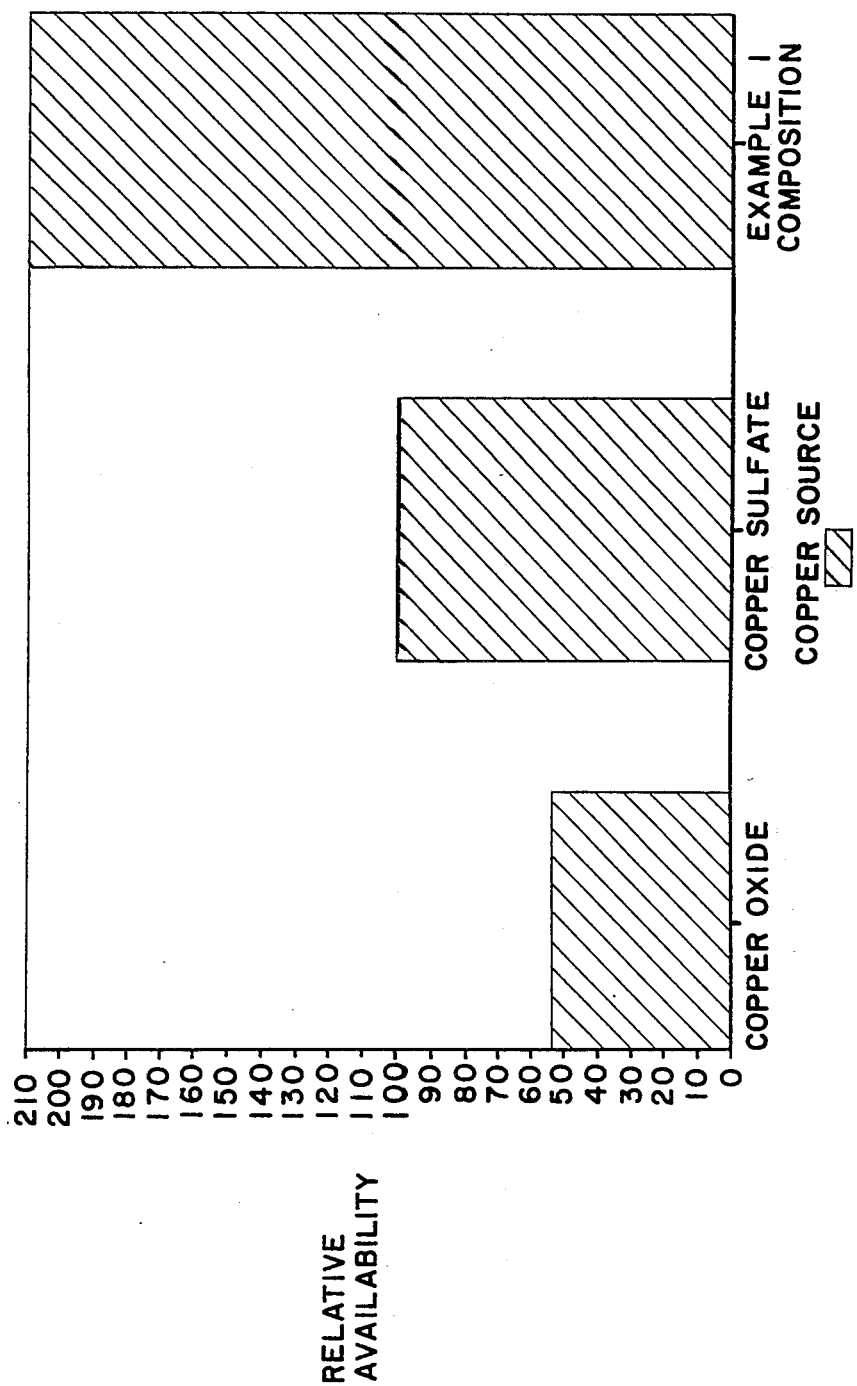
FIG. 1 graphically depicts the comparative bioavailability of a composition of the invention.

The substrate employed to sequester the metal ions to afford the present compositions is alkali-modified brewer's wort. The term "brewer's wort" as employed with respect to the present compositions is intended to refer to products which are primarily brewer's wort and spent brewer's wort. Such a product is commercially available as an aqueous syrup comprising about 40–60% solids, e.g. as Brewex ® from Anheuser-Busch Breweries, St. Louis, Mo. The solids comprise a complex mixture of carbohydrates including higher sugars and polysaccharides such as starches and dextrins. These components are readily digestable, e.g. by the enzymes present in the small intestine of ruminant and non-ruminant animals. See Brewex Technical Bulletin, ARM, Inc., P.O. Box 583, Crystal Lake, Ill., the disclosure of which is incorporated by reference herein.

It has been found that the sequestering ability of the brewer's wort can be substantially increased by treating the liquid wort with an amount of alkali effective to adjust the pH of the wort to above about 8.0, preferably to a value of about 10-10.5 or above, most preferably to about pH 11-12, prior to contacting the wort with the metal ions. It is believed that the alkali treatment modifies the wort to create additional polar sites such as carboxylic acids and hydroxyl groups on the carbohydrate molecules present.

For example, a composition prepared according to the present invention to contain 30% wort solids and 40% copper sulfate will sequester 75-100% of the total copper ion when the liquid wort has been pre-adjusted to pH 11.0, while only 30-50% of the copper ion is sequestered by adjusting the pH of the wort to 7.0 prior to introducing the copper salt.

The alkali employed to modify the wort is preferably a basic alkali metal salt such as sodium hydroxide, potassium hydroxide and mixtures thereof.

Metal Ion Source

The metal ion component of the present compositions will be provided by a metal ion salt which can act as a nutrient with respect to animals or plants. Such metallic "trace elements" are discussed with respect to mammalian nutrition in Remington's Pharmaceutical Sciences, A. Osol, ed., Mack Pub. Co. (1980) at pages 974-977, the disclosure of which is incorporated by reference herein, and include the water-soluble salts of the divalent ions of iron, cobalt, zinc, manganese, magnesium, copper, and mixtures thereof. Preferably the sulfate salt of the metal ion is employed to form the present compositions.

The added metal salt or salts employed can vary widely depending upon the intended use of the final composition. Preferably the present compositions will comprise about 5-60% by weight of total metal salts. The preferred percent by weight of the individual metal ions present in the final product are listed in Table I, below.

TABLE I

| Metal | Weight Percent |
| --- | --- |
| Manganese | 1-26% |
| Iron | 1-30% |
| Copper | 1-25% |
| Cobalt | 1-40% |
| Magnesium | 1-9.5% |
| Zinc | 1-35% |

Filler

The present compositions preferably contain an amount of filler which is mixed with the semi-solid wort-metal salt complex. Upon dewatering the mixture, a solid product is formed which can be ground to the desired particle size. Therefore any particulate, biologically inert filler can be employed in the present compositions, including inorganic fillers such as clays, silicates, diatomaceous earths and silicas such as fumed silica, silicon dioxide and the preferred hydrated silica.

Surfactant

The present compositions will also preferably contain an amount of a surfactant effective to enhance the dispersibility of the dried product in aqueous media. Preferred surfactants include nontoxic nonionic surfactants such as the preferred condensation products of ethylene oxide with the partial fatty acid esters of sorbitol and sorbitol anhydride. These materials are commercially-available from ICI Americas, Wilmington, Del., as the Tween ® series wherein the molar ratio of ethylene oxide to the alcohol is about 15-25:1 and the fatty acid is a $C_{10}$-$C_{20}$ fatty acid, e.g. a laurate, stearate or oleate. For example, Tween ® 80 (CTFA: polysorbate 80) is a mixture of oleate esters of sorbitol and sorbitol anhydride, condensed with about 20 moles of ethylene oxide.

Other useful nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500-3000 and the polyoxyethylene content is about 35-55% of the molecule by weight, i.e., Pluronic ® L-62.

Other useful nonionic surfactants include the condensation products of $C_8$-$C_{22}$ alkyl alcohols with 2-50 moles of ethylene oxide per mole of alcohol. Examples of compounds of this type include the condensation products of $C_{11}$-$C_{15}$ fatty alkyl alcohols with about 3-45 moles of ethylene oxide per mole of alcohol which are commercially-available as the Poly-Tergent ® SLF series from Olin Chemicals or the Tergitol ® series from Union Carbide, i.e. Tergitol ® 15-S-20, 15-S-12, and 15-S-15, which are formed by condensing a $C_{11}$-$C_{15}$ fatty alcohol mixture with an average of 20, 12 and 15 moles of ethylene oxide, respectively. Other nonionic surfactants which may be employed include the ethylene oxide esters of $C_6$-$C_{12}$ alkyl phenols such as (nonylphenoxy)polyoxyethylene ether. Particularly useful are the esters prepared by condensing about 8-12 moles of ethylene oxide with nonylphenol, i.e. the Igepal ® CO series (GAF Corp., New York, N.Y.).

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, and other similar materials, wherein the mole ratio of ethylene oxide to the acid, phenol, amide or alcohol is about 5-50:1.

The total amount of nonionic surfactant which is incorporated into the present products is preferably about 1-10%, most preferably about 0.5-3% by weight.

Therefore, the present dewatered compositions will comprise about 5-50%, preferably about 10-40%, brewer's wort; about 5-50% of total metal sulfate, about 0.5-3.0% of an alkali metal hydroxide; about 10-40%, preferably about 5–30%, filler and about 0.5–3% surfactant.

The dry compositions can contain about 2–10% water, preferably about 4–6% water. An about 10% aqueous solution of the present composition preferably exhibits a pH of about 5–6.

Preparation

To prepare the compositions of the present invention, the liquid brewer's wort is placed in a liquid mixer and alkali added to adjust the pH of the wort to about 10–12. After a brief period of mixing at ambient temperatures, the wort is combined with the required amount of preblended metal salts, e.g. in a dry mixer. The particulate filler is then added to the resultant paste and mixing continued to yield a free-flowing damp powder. The powder is dried to a final moisture level of about 4–6%, and then ground and screened, e.g. to about 40–80 mesh. The surfactant is then blended with the ground product in a dry mixer and the finished product is packaged.

The dry, free-flowing product readily disperses and/or dissolves in aqueous media such as water or fortified whey to yield liquid animal feeds. Such feeds typically will include about 0.025–0.5% by weight of the present composition. Aqueous formulations intended for use as sprayable fertilizers can include up to about 20% by weight of the present compositions.

The invention will be further described by reference to the following detailed examples.

EXAMPLE I

Sequestered Copper Ion Product

A composition containing sequestered cupric ion was formed using the ingredients in the proportions listed below:

| Ingredient | % by Weight |
| --- | --- |
| Brewer's Wort+ | 30 (dry basis) |
| Copper Sulfate (25% Cu) | 40 |
| Sodium Hydroxide | 1.3 |
| Hydrated Silica* | 27.7 |
| Surfactant** | 1.0 |
| | 100.0 |

+Brewex ® (50% solids).
*Zeosyl ® 110D, D. M. Huber Corp., Harve de Grace, Md.
**Polysorbate 80.

The required amount of liquid brewer's wort (50% solids) was added to a liquid mixer and stirred at about 15°–32° C. Sodium hydroxide was added portionwise to raise the pH of the wort to 11.0 with continued mixing. After 5.0 min. of further mixing, the conditioned wort is pumped into a dry mixer containing the required amount of copper sulfate. After 3.0 min., the required amount of hydrated silica is added to the resultant paste with further agitation to yield a damp, free-flowing powder. This material is then dried at 205° C. to a final moisture level of 4–6%. The dry product is then ground and screened until the granular product will pass through a 60 mesh screen. The ground product is conveyed to a dry mixer where polysorbate 80 is added to yield the final product.

EXAMPLE II

Sequestering Level Analysis

The level of sequestering exhibited by the present products is directly dependent on the pH of the brewer's wort when it is reacted with the metal sulfate salt. To demonstrate this point, three batches of the composition of Example I were made, varying the pH of the brewer's wort in each batch. The pH of the wort was adjusted to 4 in the first batch, 7 in the second and 11 in the third. When these batches were analyzed for percent bound copper using a cupric ion specific electrode (Orion Research Model 94–29), it was found that:

(1) at pH 4.0, 20% to 40% of the copper was bound to the matrix.

(2) at pH 7.0, 30% to 50% of the copper was bound to the matrix.

(3) at pH 11.0, 75% to 100% of the copper was bound to the matrix.

The present sequestering level analysis employed copper sulfate as the metal ion source due to the ease of detection of cuprous ion by cupric ion specific electrode techniques. However, other divalent metal ions are expected to be sequestered to substantially the same extent when brought into contact with wort modified as described above.

EXAMPLE III

Visual Confirmation of Sequestering

The release of the copper ions from the present compositions can be observed visually by the use of the enzyme, pancreatin, in a water solution. Pancreatin is an enzyme complex which digests carbohydrates in the small intestine of warm-blooded animals. When one gram of the composition of Example I is placed in a quart of distilled water, the resulting solution is tan in color which indicates that the copper ions remain bound within the carbohydrate matrix of the wort. When one gram of U.S.P. pancreatin is added to the solution, it immediately begins to break down the matrix of the product and copper ions are released into solution. The increasing blue-green color of the solution confirms the presence of free copper ions. This visual test evidences that cupric ions have been sequestered and that the product will release copper ions in vivo by enzymatic action.

EXAMPLE IV

Biological Availability Assay

The bioavailability of copper in the present compositions is greater than that of copper provided by free cupric sulfate. This superior bioavailability has been demonstrated for the composition of Example I by a feeding study employing white rats. Four groups of rats were fed the following rations:

Group I (3 rats)—Basal diet (10 ppm copper from copper sulfate).

Group II (3 rats)—Basal diet +250 ppm copper from copper oxide.

Group III(3 rats)—Basal diet +250 ppm copper from copper sulfate.

Group IV(3 rats)—Basal diet +250 ppm copper from the composition of Example I.

After maintaining the four diets for 21 days, the rats in each group were sacrificed and their livers were weighed and ashed. The liver residue was treated with 0.5 ml $HNO_3$ and 0.5 ml HCl, diluted to 10 ml with water and assayed for total copper by atomic absorption (AOAC Method 3.006, *Official Methods of Analysis of the AOAC*, W. Horwitz, ed., AOAC Pub. (13th ed. 1980).

The data depicted graphically on FIG. 1 demonstrates that the biological availability of copper from the composition of Example I was two times as great as the copper delivered by copper sulfate, and four times that of the copper delivered by copper oxide.

EXAMPLE V

Environmental Stability

The storage stability of dry vitamin and mineral premixes under ambient conditions is often poor. When minerals are added to vitamins in a whey or sugar environment to yield a feed supplement premix, reactions take place that may cause the product to absorb water and become caked. Such self-reactions can reduce the dispersibility and effectiveness of the premix.

The following formulation was made:

| Ingredient | % by Weight | |
|---|---|---|
| Brewer's Wort+ | 30 | (dry basis) |
| Zinc Sulfate (35% Zn) | 26 | |
| Manganese Sulfate (27% Mn) | 17 | |
| Copper Sulfate (25% Cu) | 2.5 | |
| Sodium Hydroxide | 1.3 | |
| Zeosyl ® 110D | 22.2 | |
| Polysorbate 80 | 1.0 | |
| | 100.0% TOTAL | |

+Brewex ®, 50% solids.

The required amount of 50% solids brewer's wort for the batch was added to a liquid mixer at 15°–32° C. The required amount of sodium hydroxide to raise the pH of the wort to pH 11.0 was added with mixing. After five minutes of liquid mixing, the conditioned wort was pumped into a dry mixer containing the required amount of pre-blended sulfates for the batch. After 3.0 min. of mixing, the required amount of hydrated silicon dioxide was slowly added to the mixer. Mixing was continued for 2.0 min. to yield a free-flowing, damp powder. This material was then dried at 205° C. to a final moisture level of about 4–6%. The product was ground to a particle size of less than 60 mesh. The ground product is conveyed to a dry mixer where the polysorbate ® 80 was added.

The resultant composition was employed in the following comparative test to determine its relative stability.

Three vitamin-mineral premixes were prepared as summarized in Table II.

TABLE II

| Ingredient | Pre-Mix 1 (Control) % of batch | Pre-Mix 2 (Sulfates) % of batch | Pre-Mix 3 (Composition of Ex. IV) % of batch |
|---|---|---|---|
| Vitamin B₁₂ (2000 mg/lb) | 1.1 | 1.1 | 1.1 |
| d-Pantothenic Acid USP | 4.5 | 4.5 | 4.5 |
| Riboflavin 95% | 1.3 | 1.3 | 1.3 |
| Vitamin D₃ 800,000 u/gm | 1.3 | 1.3 | 1.3 |
| Vitamin A Acetate 300,000 u/gm | 23.8 | 23.8 | 23.8 |
| Niaciamide USP | 7.0 | 7.0 | 7.0 |
| Vitamin E 50% | 4.6 | 4.6 | 4.6 |
| Choline Chloride 50% Silica | 25.0 | 25.0 | 25.0 |
| Zinc Sulfate (35% Zn) | — | 6.6 | — |
| Manganese Sulfate (27% Mn) | — | 4.2 | — |
| Copper Sulfate (25% Cu) | — | 0.63 | — |
| Dextrose | 31.4 | 19.97 | 7.4 |
| Composition of Ex. IV | — | — | 25.0 |
| TOTAL | 100.0% | 100.0% | 100.0% |

One pound (453 g) samples of Pre-Mixes 1, 2 and 3 were placed in separate open beakers and allowed to absorb atmospheric moisture for 24 hours. The ambient temperature was 24° C. and the relative humidity was 60%. After the 24 hour period, the samples were visually examined for moisture absorption, discoloration, caking and flowability. The results are summarized on Table III, below.

TABLE III

| Sample | Moisture Absorption | Discoloration | Caking | Flowability |
|---|---|---|---|---|
| Pre-Mix 1 (Control) | Little | None | None | Good |
| Pre-Mix 2 (Sulfates) | Moderate | Moderate | Moderate | Poor |
| Pre-Mix 3 (Ex. IV Comp.) | Little | None | None | Good |

The invention has been described by reference to certain specific embodiments and detailed examples. However, as would be apparent to one of skill in the art, many modifications may be made while remaining within the spirit and scope of the invention.

What is claimed is:

1. A water-dispersible solid composition comprising about 5–50% alkali-modified brewer's wort, about 5–60% of at least one nutrient divalent metal ion salt, about 0.5–3.0% of an alkali metal hydroxide, about 10–40% of an inorganic filler and about 0.5–3% of a nonionic surfactant, which is prepared by a process comprising:
   (a) adjusting the pH of liquid brewer's wort to about 10–12 by the addition of an alkali metal hydroxide;
   (b) combining the pH-adjusted wort with a divalent metal ion salt, wherein the metal ion is selected from the group consisting of iron, manganese, zinc, copper, cobalt, magnesium and mixtures thereof;
   (c) drying the salt-wort mixture in admixture with an inorganic filler to yield a solid particulate product; and
   (d) blending said particulate product with a nonionic surfactant.

2. The composition of claim 1 further comprising about 2–10% water.

3. The composition of claim 1 comprising about 1–26% manganese.

4. The composition of claim 1 comprising about 1–30% iron.

5. The composition of claim 1 comprising about 1–40% cobalt.

6. The composition of claim 1 comprising about 1–9.5% magnesium.

7. The composition of claim 1 comprising about 1–35% zinc.

8. The composition of claim 1 wherein the filler comprises hydrated silica.

9. The composition of claim 1 wherein the surfactant comprises polysorbate 80.

10. A solid animal feed pre-mix comprising a vitamin and the composition of claim 1.

11. A sprayable fertilizer comprising an aqueous dispersion of the composition of claim 1.

12. The composition of claim 1 wherein the liquid wort comprises about 40–60% solids.

13. The composition of claim 12 wherein the liquid wort is pH-adjusted by the addition of sodium hydroxide at about 15°–32° C.

14. The composition of claim 1 wherein the divalent metal ion salt is a sulfate salt.

* * * * *

UNITED STATES PATENT AND TRADEMARK OFFICE
CERTIFICATE OF CORRECTION

PATENT NO. : 4,661,358
DATED : April 28, 1987
INVENTOR(S) : Kyle A. Brokken and Randolph S. Porubcan It is certified that error appears in the above-identified patent and that said Letters Patent is hereby corrected as shown below:

At Col. 5, line 1, for "5-30%" read --15-30%--.

Signed and Sealed this

Twenty-fourth Day of November, 1987

Attest:

DONALD J. QUIGG

*Attesting Officer*   *Commissioner of Patents and Trademarks*